Nov. 12, 1935.  A. LAMBERT  2,020,322
PROCESS OF TREATMENT OF COMPLEX MATERIALS CONTAINING POTASSIUM SALTS
Filed Aug. 10, 1928
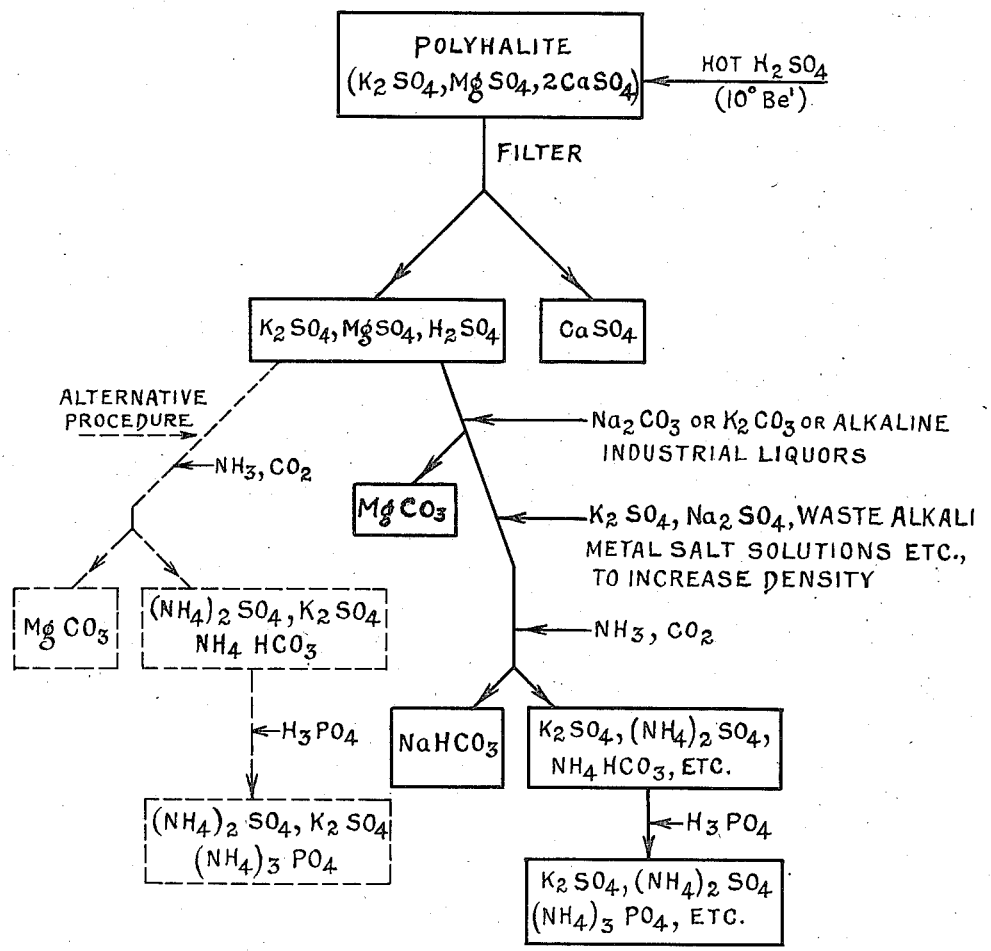
INVENTOR
ARTHUR LAMBERT
BY
ATTORNEY Patented Nov. 12, 1935

2,020,322

UNITED STATES PATENT OFFICE 2,020,322

PROCESS OF TREATMENT OF COMPLEX MATERIALS CONTAINING POTASSIUM SALTS

Arthur Lambert, New York, N. Y., assignor to Rita Vinay, New York, N. Y.

Application August 10, 1928, Serial No. 298,869
In Belgium August 11, 1927

14 Claims. (Cl. 23—38)

My invention has as its object a process of treatment of complex natural or artificial products, materials containing potassium salts such as certain minerals, leucite, alunite, glauconite (green sand of New Jersey), polyhalite, feldspars, and other compounds or alkaline, alkaline-earth, etc., complex salts, principally with a view to the obtaining of ammonium-potassium salts which are capable of being used as fertilizer, or else with a view to the extracting of certain substances or compounds.

This process consists essentially in attacking these products with an acid solution, preferably in the hot state, and in thereupon neutralizing the filtered liquid with ammonium acid carbonate, with the liquid from the filters of the ammonia process of the manufacture of soda, with potassium carbonate, or with any alkaline-reacting compond of the alkali metals or of the alkali-earth metals, or of ammonium, or, if the circumstances be such, with ammonia itself, so as to produce a precipitate and possibly ammonium-potassium salts or else complex solutions within which double decompositions take place.

In order to make the invention properly understood there will be described hereinafter different examples of its application, particularly to the treatment of glauconite (green sand of New Jersey) and of polyhalite.

Glauconite is, as is well known, an alkaline ferrugino-alumino-silicate sand whose composition varies but the best samples of which give, on analysis, the following composition:

| | Per cent |
|---|---|
| Silica ($SiO_2$) | 50.32 |
| Ferric oxide ($Fe_2O_3$) | 18.38 |
| Ferrous oxide (FeO) | 3.02 |
| Alumina ($Al_2O_3$) | 7.53 |
| Lime (CaO) | 0.65 |
| Magnesia (MgO) | 3.82 |
| Soda ($Na_2O$) | 0.22 |
| Potash ($K_2O$) | 7.88 |
| Carbonic acid ($CO_2$) | 0.15 |
| Phosphoric acid ($P_2O_5$) | 0.34 |
| Water ($H_2O$) | 8.58 |
| | 100.89 |

For the purpose of obtaining with the use of this complex product chemical fertilizers, for example, and possibly soda and ammoniacal salts and other recovery products, one proceeds in the following manner, reference being had to the accompanying drawing showing a flow sheet representing a satisfactory mode of carrying out the invention.

First phase: Solution

A mineral acid, for example sulfuric acid, is diluted with water to 10° Baumé and is poured upon the green sand, taking care to agitate if the operation takes place in the cold state. The digestion lasts from two to three hours. An elevation of the temperature is not necessary, but better and more rapid results are obtained at a temperature of 100° C. In consequence of this treatment the majority of the substances entering into the composition of the green sand are dissolved, with the exception of the silica and a certain percentage of iron oxide and of alumina.

Second phase: Filtration

The solution is filtered so as to separate the silica ($SiO_2$) as well as the traces of undissolved iron oxide and of aluminium, salts of lime and of magnesia.

The mother liquor then contains in solution:

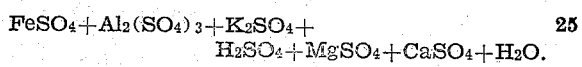

This mother liquor is acid.

Third phase: Neutralization of the mother liquor

There is then added to the mother liquor sodium carbonate in the proportion of 1 to 25 by weight. The reaction is expressed by the following equation:

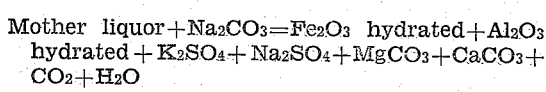

The precipitate resulting from this neutralization is of a red color and is composed of:

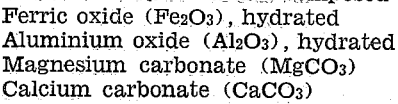

The carbon dioxide gas ($CO_2$) which is liberated during the neutralization may be recovered in manufacture on a large scale and may be utilized in the subsequent phases of the process.

Fourth phase: Filtration of the neutralized liquid of the third phase

The neutralized liquid obtained in the third phase is then again taken up and filtered. The liquid that is obtained is clear and contains potassium sulfate and sodium sulfate with a trace of sodium carbonate in solution. Its density is from 10° to 15° Baumé.

*Fifth phase: Concentration or enrichment*

There then follows the concentration or enrichment of this liquid by one of the following methods:

(1) By evaporation in a Kestner or Seanson apparatus;

(2) By the addition of commercially pure sodium chloride (NaCl);

(3) By the addition of a mixture or mineral containing sodium chloride (NaCl) and potassium chloride (KCl);

(4) By the addition of sodium sulfate;

(5) By the addition of a compound containing sodium chloride and potassium sulfate;

(6) Or else by the addition, according to the factories and locations, of similar substances obtained as residues of manufacture in these factories.

If one increases the density of this liquid to 28° Baumé, it becomes mechanically a kind of artificial sylvinite but contains potassium sulfate instead of or along with potassium chloride.

This potassium sulfate passes into the mother liquors of the phase which will be indicated hereinafter, like the potassium chloride. These potassium salts constitute, as is well known, the best and most common of chemical fertilizers. If one has in view the production of fertilizers of this kind, the compound utilized for the enrichment of the filtrate originating from the third phase must be a natural or artificial compound that is adapted to reinforce the percentage of potassium.

*Sixth phase: Manufacture of soda and of ammoniacal salts*

We have seen above how it is possible to obtain chemical fertilizers by means of the treatment and enrichment of the neutralized filtrate that is obtained in the course of the third phase of the process. It is, nevertheless, likewise possible to use this filtrate for the manufacture of other products, for example soda and ammoniacal salts.

In the latter case liquid or gaseous ammonia is added to the mother liquors obtained in the course of the third phase and prepared as has been indicated in the course of the fifth phase, and carbon dioxide gas is caused to bubble into the solution.

The result of this reaction is that the potassium sulfate, not being attacked, remains in the solution, while ammonium sulfate ($(NH_4)_2SO_4$) is formed in solution and sodium bicarbonate is precipitated according to the following equation:

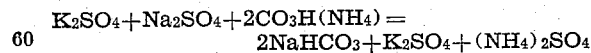

The potassium sulfate and the ammonium sulfate are not chemically combined, but are in complex solution and may be separated by fractional crystallization. If one wishes to use the potassium sulfate as a salt for the production of potassium silicate, it will be necessary first to convert this potassium sulfate into potassium carbonate.

The sodium bicarbonate may be reconverted into sodium carbonate and reutilized in the cycle of operations or else be utilized in the production of sodium salts. The ammonia may also be recovered and reused in the cycle of operations without undergoing any appreciable loss (not exceeding, for example, 1 percent).

*Seventh phase: Separation of components of precipitate*

The separation of the oxides from the carbonates contained in the precipitate that is obtained in the third phase is effected in the following manner. The precipitate is diluted with water and one adds hydrochloric acid (HCl) in the proportion of 1 to 40 by weight and liquid ammonia ($NH_3$) until precipitation.

The following reaction takes place:

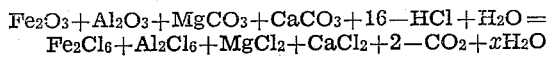

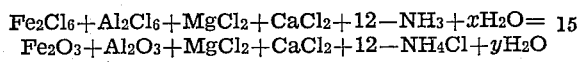

that is to say, upon neutralization of the acid solution with ammonia, the ferric oxide ($Fe_2O_3$) as well as the alumina ($Al_2O_3$) are precipitated, whereas the magnesium chloride ($MgCl_2$), the calcium chloride ($CaCl_2$), and the ammonium chloride ($NH_4Cl$) remain in solution. Care must be taken of course to avoid an excess of ammonia and re-solution of the alumina.

*Eighth phase: Treatment of the residues*

We have seen that the operation of filtration which represents the second phase of the treatment gives, as residues of the digestion of the green sand in sulfuric acid, silica with traces of iron oxide and of alumina.

These residues are insoluble in water and in the acid. They are treated by means of an addition of sodium carbonate in the proportion of from 25 to 50 per cent of the weight of the residues, fusion at a temperature of 1800° C., and cooling by immersion of the molten mass in cold water.

In this water the silicate passes into solution and leaves a precipitate of iron oxide and alumina ($Fe_2O_3+Al_2O_3$) according to the following equation:

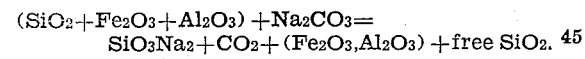

The residue that is thus obtained is now soluble in the acid, whereas the residue obtained after the first phase was not.

The free silica in this residue is accompanied by a compound silica which one might call "amorphous sodio-ferric silicate". In other words, the products, that are formed are sodium silicate ($SiO_3Na_2$) or water glass, carbon dioxide gas ($CO_2$), and anhydrous oxide of iron and oxide of aluminum ($Fe_2O_3+Al_2O_3$).

The carbon dioxide gas may be recovered and used in the process, for example for the purpose of transforming sodium chloride (NaCl) or sodium sulfate ($Na_2SO_4$) into sodium bicarbonate in the fifth phase.

The anhydrous oxide of iron and oxide of aluminium are not chemically combined, but in mixture. They are insoluble in water, but may be attacked by different acids.

When the mixture is crushed, it has the appearance of black sand. The sodium silicate is soluble in water.

*Ninth phase: Separation of the ferric oxide from the aluminium oxide*

We have seen above that the treatment corresponding to the third phase gives a precipitate containing ferric oxide and aluminium oxide, and that these products are separated from the magnesium carbonate and from the calcium carbonate in the course of the fourth phase. In order now to separate the ferric oxide from the aluminium oxide one proceeds as follows. One adds sodium carbonate ($Na_2CO_3$) in the proportion of 1 to 25 by weight; one boils and filters. In this way one obtains sodium aluminate, carbon dioxide gas ($CO_2$), and a precipitate of ferric oxide ($Fe_2O_3$), according to the following equation:

$$Fe_2O_3 + Al_2O_3 + 3Na_2CO_3 + 3H_2O = Fe_2O_3 + Al_2O_3 + 3Na_2O + 3CO_2 + H_2O.$$

The same result may be obtained by means of the calcination or fusion of $Fe_2O_3 + Al_2O_3$ with sodium carbonate or with sodium sulfate.

The residue that is obtained in the course of the eighth phase may be treated at the same time as the latter or by means of ammonia ($NH_3$) alone.

*Tenth phase: Precipitation of the alumina*

For the purpose of precipitating the alumina ($Al_2O_3$) from the sodium aluminate that is obtained as above, carbonic acid ($CO_2$) is caused to bubble into the filtered liquid, according to the following equation:

$$Al_2O_3, 3Na_2O + 3CO_2 + H_2O = Al_2O_3 + 3Na_2CO_3 + H_2O.$$

The products obtained are sodium carbonate ($Na_2CO_3$) in solution and the precipitate of hydrate of alumina ($Al_2O_3$) hydrated.

The sodium carbonate passes in the filtration.

*Eleventh phase: Recovery of the sodium carbonate*

The sodium carbonate ($Na_2CO_3$) may be recovered as such, or it may be converted into caustic soda (NaOH) in conformity with the following equation:

$$Na_2CO_3 + CaO + 2H_2O = 2NaOH + CaCO_3 + H_2O,$$

the products being caustic soda (NaOH) and calcium carbonate ($CaCO_3$). The $CaCO_3$ may be utilized in the cycle of operations for the purpose of causticizing the sodium carbonate after its conversion into CaO by calcination.

*Twelfth phase: Production of aluminium sulfate*

In the tenth phase, hereinbefore described, pure alumina is precipitated from the sodium aluminate by means of carbonic acid, in the cold state, with energetic bubbling for the purpose of obtaining a granular powder which one easily deprives of every trace of soda by means of rinsings. It is dissolved easily in hot sulfuric acid, with which it forms a salt without excess of acid and without iron. In this way one obtains a solution of aluminium sulfate $$(Al_2(SO_4)_3),$$

hydrated.

*Thirteenth phase: Obtaining of potassium sulfate*

We have seen, in the sixth phase, how one obtains ammonium-potassium salts $$(K_2SO_4 + 3(NH_4)_2SO_4).$$

By means of crystallization the potassium sulfate can be separated from the ammonium salt.

*Fourteenth phase: Obtaining of alum, $Al_2(SO_4)_3$, $K_2SO_4$, hydrated*

For the purpose of converting the aluminium sulfate, $Al_2(SO_4)_3$ hydrated, into alum, it suffices to mix concentrated solutions of aluminium sulfate and of potassium sulfate in equimolecular proportions. The alum, which is far less soluble in the cold state than each of the constituents, is deposited in the form of a crystalline powder which constitutes pulverized alum. In order to obtain large crystals it may be redissolved in hot water and allowed to crystallize slowly.

The example explained in detail above shows how, starting from green sand, one can obtain ammonium-potassium salts or other substances, according to the manufacture which one has in view. In order to show the general application of the process, we shall further describe hereinafter its application to the treatment of polyhalite ($K_2SO_4 + MgSO_4 + 2CaSO_4$), which, down to the present day, has been utilized only with difficulty for the extraction of potassium salts by reason of its slight solubility resulting from its high content of calcium sulfate.

For the purpose of doing away with this difficulty one proceeds in the following manner.

One attacks the polyhalite in the hot state with sulfuric acid diluted to 10° Baumé, so as to extract the potassium sulfate therefrom even if it is protected by calcium sulfate ($CaSO_4$) in quantity. One thereupon filters as in the case of the treatment of green sand, hereinbefore described, so as to obtain in the filter the calcium sulfate and in the filtered liquid all of the potassium sulfate and magnesium sulfate. One thereupon precipitates the magnesium sulfate in the state of magnesium carbonate by means of ammonium carbonate, by attacking the solution directly, after the manner of the Solvay process, with carbonic acid ($CO_2$) and ammonia ($NH_3$) simultaneously, or, better still, by forming separately a concentrated solution of ammonium acid carbonate, ($NH_4$)$HCO_3$, and pouring it into the filtered liquid. In this way one obtains ammonium-potassium salts in the filtered liquid. The mixture of these salts forms a valuable fertilizer which may be improved by fixing the excess ammonia with phosphoric acid or an acid phosphate.

One may also treat the clarified and filtered liquid originating from the dissolving of the polyhalite by means of an addition of sodium carbonate, so as to obtain a precipitate of magnesium carbonate. Then what remains in solution is sodium sulfate and potassium sulfate, i. e., a kind of artificial sylvinite in which the chlorides are replaced by sulfates. The solution may be concentrated or enriched with sodium salts, (NaCl, $Na_2SO_4$, etc.) or with sodium salts mixed with potassium salts, (KCl, $K_2SO_4$, etc.), or both procedures may be employed to increase its density to 28° Baumé.

The solution is thereupon treated with carbonic acid ($CO^2$) and ammonia simultaneously at about 33.3° C. and sodium bicarbonate and ammonium-potassium salts formed, the potassium sulfate being very slightly subject to attack. This product constitutes, after crystallization, a fertilizer of first-class quality which may be improved by fixing the excess ammonia, before crystallization, with phosphoric acid or with an acid phosphate. If desired, however, one may likewise separate the potassium and ammonium salts.

Finally one may also increase the potassium content by attacking with potassium carbonate (instead of ammonium acid carbonate) so as to precipitate the magnesium carbonate. After filtration one still obtains ammonium-potassium salts after treatment with $CO_2$ and $NH_3$.

If desired, the acid solution of the mineral may first be neutralized with an oxide or hydroxide, such as NaOH and NH4OH, and then treated with a carbonate as described above to precipitate the magnesium. This is not shown on the flow sheet.

It is necessary to observe that, whatever the complex substance that is treated may be, one need not necessarily have recourse to treatment with sulfuric acid, since any other suitable acid or acidic material—hydrochloric acid, nitric acid, phosphoric acid, sodium acid sulfate, etc. may likewise be suitable and give an acid filtered liquid, which one thereupon neutralizes, according to the products that are to be obtained, either with the liquid from the filters of the Solvay process, or with ammonium carbonate in solid form or in solution, or else with ammonia from any source, or with a suitable salt, such as the carbonate of potassium, barium, calcium, or magnesium, or with any base or basic salts of the alkaline metals (sodium, potassium) or of the alkali-earths, or of ammonium.

In order to facilitate the attack, when one employs hydrochloric acid, one may likewise add a little nitric acid (one-fifth); one thus obtains aqua regia, which has greater dissolving power.

In the treatment with ammonium carbonate, it is quite evident that this substance may be added either in the liquid state or in the solid state. One may likewise form it directly in the solution by proceeding in the following manner: one first causes carbonic acid to bubble through in the necessary quantity, then one adds the quantity of liquid ammonia or of ammonia gas to form ammonium bicarbonate, an excess of ammonia being admissible, if necessary. One may likewise commence by adding the ammonia and then cause the carbonic acid to bubble through. Furthermore, one may cause the two gases to arrive in a pipe together before entering another one that is immersed in the solution, or else one may cause the two gases to arrive in the solution at the same time.

In order to show still better the general applicability of the treatment with acid, we shall further give below, in its main outlines, the treatment with phosphoric acid.

In this case, instead of attacking polyhalite, green sand (glauconite), leucite, etc., with a mineral acid, one attacks directly with phosphoric acid and then one filters as in previous cases.

The silica that is present remains in the filter, while the alumina, the oxide of iron that may possibly be present, and the potassium are found in the liquid, combined with the phosphoric acid, as well as phosphoric acid in excess. One thereupon neutralizes with ammonia or ammonium carbonate or with a basic compound of the alkali (sodium, potassium) or alkali earth (calcium, barium, magnesium) metals or with the liquid from the filters of the ammonia soda process. In this way one precipitates the alumina and the oxide of iron, and one filters. The residue is thereupon treated, according to the various cases, with a view to effecting the separation of the alumina, the oxide of iron, and the other products. In a general way, the filtered liquid contains the phosphoric acid combined with the soluble salts. If any free or excess ammonia is present, it may be fixed with phosphoric acid or with an acid phosphate. By means of crystallization one obtains a phosphated ammonium-potassium fertilizer.

Where in the appended claims I employ the term "an alkali metal carbonate salt" the same is intended to include both normal and acid carbonates of the alkali metals and of ammonium and also the mixture of carbon dioxide, and ammonia, which together form normal and acid ammonium carbonate.

By "ammonia and carbon dioxide in any order" is to be understood that the filtrate may be saturated first with ammonia and carbon dioxide then bubbled through it or vice versa; or that the gases are bubbled through simultaneously or that a solution of ammonium acid carbonate is first formed and then added to the filtrate.

Variations may be resorted to within the scope of the claims without departing from the spirit of the invention.

What is claimed is:

1. The process which comprises treating polyhalite with a dilute mineral acid, filtering off the insoluble material, neutralizing the acid filtrate with an excess of sodium carbonate, and filtering the resulting mixture, and treating said filtrate with ammonia and carbon dioxide in any order to precipitate sodium bicarbonate, filtering the solution and treating the resulting filtrate with an acid phosphate and crystallizing the salts therefrom.

2. The process which comprises treating polyhalite with dilute sulphuric acid at elevated temperatures, separating the solution containing potassium and magnesium from the insoluble material, adding an excess of a carbonate of sodium to precipitate the dissolved alkali earth metal salts, separating the solution of potassium and sodium salts from the precipitate, then subjecting said solution to the action of ammonium bicarbonate to precipitate the sodium in the form of sodium bicarbonate, and separating the solution of potassium and ammonium salts.

3. The process as set forth in claim 2, wherein the density of the solution is increased to 28° Bé. by the addition of alkali metal salts prior to the treatment with ammonium bicarbonate.

4. The process as set forth in claim 2, wherein the density of the solution is increased to 28° Bé. by the addition of alkali metal salts, and including the step of maintaining the temperature of the solution at approximately 33° C. during the treatment with the ammonium bicarbonate.

5. The process which comprises treating polyhalite with dilute sulphuric acid at elevated temperatures, separating the insoluble material, adding to the solution an excess of a compound selected from the group consisting of the alkaline reacting compounds of sodium, potassium and ammonium, to precipitate the alkali earth salts, and separating the solution of alkali metal salts from the precipitate.

6. The process which comprises treating polyhalite with dilute sulphuric acid at elevated temperatures, separating the insoluble material, and treating the solution with ammonia and carbon dioxide in either order to obtain a solution of alkali metal and ammonium salts.

7. The method of treating polyhalite to extract potassium therefrom which includes the steps of treating the mineral with dilute sulphuric acid at elevated temperatures, separating the insoluble material, adding an excess of sodium carbonate to the solution to precipitate the alkali earth metals, separating the solution of potassium and sodium salts, and reacting such solution with ammonium bicarbonate to precipitate the sodium and produce a mixture of potassium and ammonium sulphate.

8. The process of extracting potassium from polyhalite, which comprises treating the mineral with a dilute mineral acid at elevated temperatures, separating the insoluble materials, adding an excess of a carbonate of sodium to the solution to effect precipitation of the alkali earth metals, separating the solution of potassium and sodium salts from the precipitate, adding alkali metal salts to said solution until a density of approximately 28° Bé. is obtained, maintaining the solution at a temperature of approximately 33° C., introducing ammonia and carbon dioxide in any order into the solution, separating the precipitated sodium bicarbonate from the solution of potassium and ammonium salts, and then crystallizing out the last mentioned salts.

9. The process of extracting potassium from polyhalite, which comprises treating the mineral with a dilute mineral acid at elevated temperatures, separating the insoluble material, adding an excess of a carbonate of sodium to the solution to effect precipitation of the alkali earth metals, separating the solution of potassium and sodium salts from the precipitate, adding alkali metal salts to said solution until a density of approximately 28° Bé. is obtained, introducing ammonia and carbon dioxide into the enriched solution in any order, and separating the precipitate of sodium bicarbonate from the solution of potassium and ammonium salts.

10. The process of extracting potassium from polyhalite, which comprises treating the mineral with a dilute mineral acid at elevated temperatures, separating the insoluble material, adding an excess of a carbonate of sodium to the solution to effect precipitation of the alkali earth metals, separating the solution of potassium and sodium salts from the precipitate, adding alkali metal salts to said solution until a density of approximately 28° Bé. is reached, and then treating such solution to separate the sodium from the potassium salts.

11. The process of extracting potassium from polyhalite, which comprises treating the mineral with a dilute mineral acid at elevated temperatures, separating the insoluble material, adding an excess of a carbonate of sodium to the solution to effect precipitation of the alkali earth metals, and separating the solution of potassium and sodium salts from the precipitate.

12. The method according to claim 7, which includes the step of adding a salt of an alkali metal to the potassium-containing liquor, after the precipitation of the alkali earth metals, to increase the concentration of alkali metal salts therein.

13. The method according to claim 11, including the step of adding a salt of an alkali metal to the potassium-containing liquor, after the precipitation of the alkali earth metals, to increase the concentration of alkali metal salts therein.

14. The method according to claim 7, including the step of treating the final solution of potassium and ammonium sulphate with phosphoric acid.

ARTHUR LAMBERT.